US012749971B2

(12) United States Patent
Chen et al.

(10) Patent No.: US 12,749,971 B2
(45) Date of Patent: Sep. 29, 2026

(54) DUAL-INPUT LOW DROP OUT VOLTAGE REGULATING CIRCUIT AND CONTROLLING CIRCUIT INCLUDING THE SAME

(71) Applicant: Monolithic Power Systems, Inc., Kirkland, WA (US)

(72) Inventors: Wei-Chung Chen, Zhubei City (TW); Yu-Huei Lee, Zhubei City (TW)

(73) Assignee: Monolithic Power Systems, Inc., Kirkland, WA (US)

( * ) Notice: Subject to any disclaimer, the term of this patent is extended or adjusted under 35 U.S.C. 154(b) by 155 days.

(21) Appl. No.: 18/912,161

(22) Filed: Oct. 10, 2024

(65) Prior Publication Data

US 2026/0106544 A1 Apr. 16, 2026

(51) Int. Cl.

| | |
|---|---|
| ***G05F 1/56*** | (2006.01) |
| ***G05F 1/46*** | (2006.01) |
| ***G05F 1/563*** | (2006.01) |
| ***H02M 1/00*** | (2006.01) |
| ***H02M 3/156*** | (2006.01) |

(52) U.S. Cl.
CPC ............ *H02M 3/156* (2013.01); *G05F 1/461* (2013.01); *G05F 1/56* (2013.01); *G05F 1/563* (2013.01); *H02M 1/0045* (2021.05)

(58) Field of Classification Search
CPC ..... H02M 3/156; H02M 1/0045; G05F 1/461; G05F 1/56; G05F 1/563
See application file for complete search history.

(56) References Cited

U.S. PATENT DOCUMENTS 7,064,534 B2 * 6/2006 McClure ................ G05F 3/247 307/64
2025/0088106 A1 * 3/2025 Yang .................... H02M 3/156

* cited by examiner

*Primary Examiner* — Gary L Laxton
(74) *Attorney, Agent, or Firm* — Ashurst Perkins Coie US LLP

(57) ABSTRACT

A dual-input voltage regulating circuit includes a first input terminal a second input terminal, and an output terminal. The first input terminal receives a first input voltage. The second input terminal receives a second input voltage. The first input voltage is higher than the second input voltage. The output terminal provides a regulated output voltage. The dual-input voltage regulating circuit draws power from at least one of the first input voltage and the second input voltage. When the regulated output voltage is maintained at a first voltage value, the dual-input voltage regulating circuit draws power from both the first input voltage and the second input voltage. When the regulated output voltage is maintained at a second voltage value that is higher than the first voltage value, the dual-input voltage regulating circuit draws power from the second input voltage and does not draw power from the first input voltage.

11 Claims, 6 Drawing Sheets

DUAL-INPUT LOW DROP OUT VOLTAGE REGULATING CIRCUIT AND CONTROLLING CIRCUIT INCLUDING THE SAME

TECHNICAL FIELD

The present invention relates to voltage regulation, and in particular, but not limited to a dual-input voltage regulating circuit for providing a regulated voltage based on two power supplies, and a controlling circuit of a switching power converter including the dual-input voltage regulating circuit.

BACKGROUND

New automotive designs are adopting high voltage (e.g., 48V) power systems to reduce the weight and power loss in the vehicle's cable harnesses. The high voltage is usually converted down to a much lower voltage (such as 3.3V or 5V) through one or more power conversion stages to support low voltage systems like infotainment systems in the automotives.

Typically, a step-down power converter is used to convert the high voltage into the much lower voltage. A low drop-out voltage regulator ("LDO") may be integrated into the step-down power converter to provide an appropriate operating voltage required by its internal low-voltage modules or circuit elements in the step-down power converter. For such scenario where the input voltage of the step-down power converter is high and the output voltage is fairly lower than the input voltage, powering the internal low-voltage modules of the step-down power converter to ensure that these low-voltage modules can operate normally and meanwhile considering reducing power loss and improve heat dissipation would be beneficial.

SUMMARY

According to an embodiment of the present disclosure, a dual-input voltage regulating circuit is provided. The dual-input voltage regulating circuit includes a first input terminal a second input terminal, and an output terminal. The first input terminal is configured to receive a first input voltage. The second input terminal is configured to receive a second input voltage. The first input voltage is higher than the second input voltage. The output terminal is configured to provide a regulated output voltage. The dual-input voltage regulating circuit is configured to draw power from at least one of the first input voltage and the second input voltage. When the regulated output voltage is maintained at a first voltage value, the dual-input voltage regulating circuit draws power from both the first input voltage and the second input voltage. When the regulated output voltage is maintained at a second voltage value, the dual-input voltage regulating circuit draws power from the second input voltage and does not draw power from the first input voltage. The first voltage value is lower than the second voltage value.

According to an embodiment of the present disclosure, a switching power converter is provided. The switching power converter is configured to convert an input voltage to an output voltage which is lower than the input voltage. The switching power converter includes: a power input terminal, a bias terminal, and a dual-input voltage regulating circuit. The power input terminal is configured to receive the input voltage. The bias terminal is configured to receive the output voltage. The dual-input voltage regulating circuit includes a first input terminal, a second input terminal, and an output terminal. The first input terminal is configured to receive the input voltage through the power input terminal. The second input terminal is configured to receive the output voltage through the bias terminal. The output terminal is configured to provide a regulated output voltage. The dual-input voltage regulating circuit is configured to draw power from at least one of the input voltage and the output voltage. When the regulated output voltage is maintained at a first voltage value, the dual-input voltage regulating circuit draws power from both the input voltage and the output voltage; and when the regulated output voltage is maintained at a second voltage value, the dual-input voltage regulating circuit draws power from the input voltage and does not draw power from the output voltage.

According to an embodiment of the present disclosure, a voltage regulating method is provided. The method includes the following actions. A first sub voltage regulating circuit controls a first current provided from a first input terminal to an output terminal. A second sub voltage regulating circuit controls a second current provided from a second input terminal to the output terminal. The first sub voltage regulating circuit receives a feedback voltage that is indicative of an output voltage on the output terminal and a first reference voltage. The second sub voltage regulating circuit receives the feedback voltage and a second reference voltage. The first reference voltage is lower than the second reference voltage. The first sub voltage regulating circuit determines whether the feedback voltage becomes lower than or equal to the first reference voltage by comparing the feedback voltage to the first reference voltage. The second sub voltage regulating circuit determines whether the feedback voltage becomes lower than the second reference voltage by comparing the feedback voltage to the second reference voltage. When the feedback voltage becomes lower than the second reference voltage but higher than the first reference voltage, the second sub voltage regulating circuit provides the second current from the second input terminal to the output terminal and the first sub voltage regulating circuit does not provide the first current from the first input terminal to the output terminal. When the feedback voltage becomes lower than or equal to the first reference voltage, the first sub voltage regulating circuit provides the first current from the first input terminal to the output terminal and the second sub voltage regulating circuit provides the second current from the second input terminal to the output terminal.

BRIEF DESCRIPTION OF DRAWINGS

The present invention can be further understood with reference to the following detailed description and appended drawings, wherein like elements are provided with like reference numerals. These drawings are only for illustration purpose, thus may only show part of the devices and are not necessarily drawn to scale.

DETAILED DESCRIPTION

Various embodiments of the present invention will now be described. In the following description, some specific details, such as example circuits and example values for circuit components, are included to provide a thorough understanding of the embodiments. One skilled in the relevant art will recognize, however, that the present invention can be practiced without one or more specific details, or with other procedures, components, materials, etc.

Throughout this description, the phrases "in one embodiment", "in an embodiment", "in some embodiments", "in an example", "in some examples", "in one implementation", and "in some implementations" are used to include both combinations and sub-combinations of various features described herein as well as variations and modifications thereof. The phrase "in one embodiment," as used herein does not necessarily refer to the same embodiment, although it may. Throughout the specification and claims, the term "coupled," as used herein, is defined as directly or indirectly connected in an electrical or non-electrical manner. The terms "a," "an," and "the" include plural reference, and the term "in" includes "in" and "on". The term "or" is an inclusive "or" operator and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signals. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
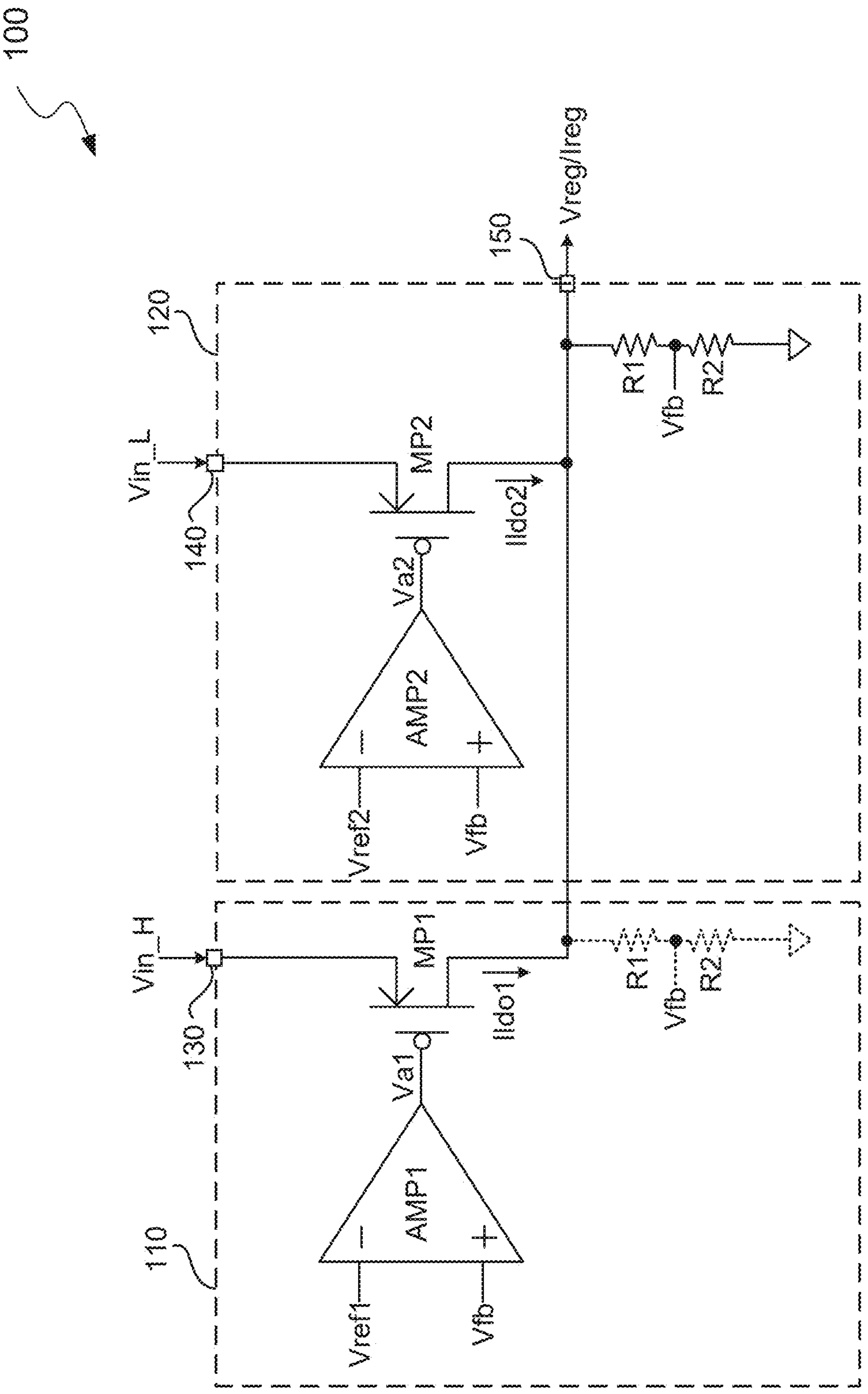
FIG. 1 illustrates a circuit diagram of a dual-input voltage regulating circuit 100, in accordance with an embodiment of the present invention.

FIG. 1 illustrates a circuit diagram of a dual-input voltage regulating circuit 100, in accordance with an embodiment of the present invention. The dual-input voltage regulating circuit 100 may be applied to any suitable implementation. In an example, the dual-input voltage regulating circuit 100 may be applied to a power management integrated circuit ("IC") such as a power converter, or a controller etc. to provide an appropriate operating voltage required by other low-power circuit elements in the IC.

As shown in FIG. 1, the dual-input voltage regulating circuit 100 includes a first sub voltage regulating circuit 110 and a second sub voltage regulating circuit 120 arranged in a parallel structure.

The first sub voltage regulating circuit 110 receives a first input voltage Vin_H from a first input terminal 130, and the second sub voltage regulating circuit 120 receives a second input voltage Vin_L from a second input terminal 140. For example, in a scenario where the dual-input voltage regulating circuit 100 is integrated into a step-down power converter which converts a high input voltage to a stepped-down output voltage, the first input voltage Vin_H is received from the high input voltage and the second input voltage Vin_L is received from the stepped-down output voltage. In an embodiment, the first sub voltage regulating circuit 110 and the second sub voltage regulating circuit 120 are connected to a common output terminal 150 and collectively provide an output current Ireg and regulate an output voltage Vreg on the output terminal 150. The output terminal 150 is further coupled to a load (not shown). Taking the aforementioned step-down power converter as an example, the load of the dual-input voltage regulating circuit 100 may include other low-power circuit elements in the step-down power converter.

In an embodiment, each of the first sub voltage regulating circuit 110 and the second sub voltage regulating circuit 120 includes a low drop-out (LDO) voltage regulator as shown in FIG. 1. It should be understood by those skilled in the art that the first sub voltage regulating circuit 110 and the second sub voltage regulating circuit 120 may be implemented by any type of low dropout linear regulator known in the art. The present invention does not limit thereto.

In an embodiment, the first sub voltage regulating circuit 110 is configured to control a first LDO current Ildo1 provided from the first input terminal 130 to the output terminal 150. In an embodiment, the second sub voltage regulating circuit 120 is configured to control a second LDO current Ildo2 provided from the second input terminal 140 to the output terminal 150. The first LDO current Ildo1 and the second LDO current Ildo2 are merged at the output terminal 150 to provide the output current Ireg.

In an embodiment, the second input voltage Vin_L is higher but close to a target output voltage of the dual-input voltage regulating circuit 100. In an embodiment, the first input voltage Vin_H is higher than the second input voltage Vin_L. In an embodiment, the first input voltage Vin_H is twice higher than the second input voltage Vin_L. For example, the first input voltage Vin_H is in a wide and high input voltage range, for example, from 30V to 60V, and the second input voltage Vin_L is in a wide and low output voltage range, for example, from 1V to 12V. In an example, the first input voltage Vin_H is 48V and the second input voltage is 5V. The values of the first input voltage Vin_H and the second input voltage Vin_L here are only exemplary, and the present invention is not so limited. The first input voltage Vin_H and the second input voltage Vin_L may have other voltage values according to actual applications and design requirements. In such embodiments, the first sub voltage regulating circuit 110 operates in a large drop-out voltage condition if it is enabled to provide the first LDO current Ildo1 and the second sub voltage regulating circuit 120 operates in a low drop-out voltage condition compared to the first sub voltage regulating circuit 110 if it is enabled to provide the second LDO current Ildo2. A large dropout voltage may cause thermal problem and power loss. Therefore, in accordance with an embodiment of the present invention, as long as the second sub voltage regulating circuit 120 is capable of regulating and sustaining the output voltage Vreg to a target voltage value (hereinafter referred to a second target voltage value V_target2) which is within a required target voltage range (e.g., a required target voltage range required by the aforementioned other low-voltage circuit elements to operate normally), the first sub voltage regulating circuit 110 is not enabled to provide the current (e.g., the first LDO current Ildo1) to the output terminal 150. That is, in this situation, the second sub voltage regulating circuit 120 provides the second LDO current Ildo2 from the second input terminal 140 (i.e., powered by the second input voltage Vin_L) to the output terminal 150 and the first sub voltage regulating circuit 110 does not provide the first LDO current Ildo1 from the first input terminal 130 to the output terminal 150. In other words, when the output voltage output voltage Vreg is maintained at the second target voltage value V_target2, the dual-input voltage regulating circuit 100 draws power from the second input voltage Vin_L and does not draw power from the first input voltage Vin_H. And if the second sub voltage regulating circuit 120 fails or is about to fail to regulate the output voltage Vreg to the second target voltage value V_target2 or no longer has the ability to provide additional current to the output terminal 150, then the first sub voltage regulating circuit 110 is enabled to assist in providing the first LDO current Ildo1 to the output terminal 150, and to regulate, together with the second sub voltage regulating circuit 120, the output voltage Vreg to another target voltage value (hereinafter referred to a first target voltage value V_target1) which is also within the required target voltage range. That is, in this situation, the second sub voltage regulating circuit 120 provides the second LDO current Ildo2 from the second input terminal 140 (i.e., powered by the second input voltage Vin_L) to the output terminal 150 and the first sub voltage regulating circuit 110 provides the first LDO current Ildo1 from the first input terminal 130 (i.e., powered by the first input voltage Vin_H) to the output terminal 150 simultaneously. In other words, when the output voltage output voltage Vreg is maintained at the first target voltage value V_target1, the dual-input voltage regulating circuit 100 draws power from both the second input voltage Vin_L and the first input voltage Vin_H.

As such, the second input voltage Vin_L which is lower than the first input voltage Vin_H may function as a main power supply and the higher first input voltage Vin_H may function as an auxiliary power supply. The auxiliary power supply may assist in supplying power when the main power supply fails to or is about to fail to regulate and sustain the output voltage Vreg to the second target voltage value V_target2 or no longer be able to provide any additional current. For example, when the main power supply decrease or the load current increase (or the load resistance decreases) to such an extent that, for example, a pass device in the second sub voltage regulating circuit regulator 120 has reached its minimum drain-to-source resistance ($R_{DS(on)}$) and may no longer operate in a linear region (or a Ohmic region), the main power supply may be considered as failing to regulate and sustain the output voltage Vreg to the second target voltage value V_target2.

As shown in FIG. 1, each of the first sub voltage regulating circuit 110 and the second sub voltage regulating circuit 120 includes a pass device (e.g., a first pass device MP1 or a second pass device MP2 as illustrated in FIG. 1), a differential amplifier (e.g., a first differential amplifier AMP1 or a second differential amplifier AMP2 as illustrated in FIG. 1) and a feedback circuit (e.g., each feedback circuit include a resistor R1 and resistor R2 as illustrated in FIG. 1).

In an embodiment, as shown in FIG. 1, each of the first pass device MP1 and the second pass device MP2 includes a P-type Metal Oxide Semiconductor Field Effect Transistor (PMOSFET). However, in another embodiment, each of the first pass device MP1 and the second pass device MP2 may also include an N-type Metal Oxide Semiconductor Field Effect Transistor (NMOSFET) or a bipolar transistor, or the like. In such embodiment, other circuit elements in the corresponding sub voltage regulating circuit (for example, the first differential amplifier AMP1 or the second differential amplifier AMP2) may be modified or rearranged to properly drive the first pass device MP1 and the second pass device MP2.

The resistors R1 and R2 form the feedback circuit for providing a feedback voltage Vfb that is indicative of the output voltage Vreg to both the first differential amplifier AMP1 and the second differential amplifier AMP2. For example, as shown in FIG. 1, the feedback voltage Vfb is provided to noninverting terminals of the first differential amplifier AMP1 and the second differential amplifier AMP2. The feedback voltage Vfb is proportional to the output voltage Vreg. In an embodiment, to reduce the circuit complexity, the first sub voltage regulating circuit 110 and the second sub voltage regulating circuit 120 share the same feedback circuit.

In an embodiment, the first differential amplifier AMP1 receives a first reference voltage Vref1 at a first terminal (for example, an inverting terminal) and receives the feedback voltage Vfb at a second terminal (for example, a noninverting terminal) and compares the first reference voltage Vref1 against the feedback voltage Vfb to generate a first control signal Va1. The second differential amplifier AMP2 receives a second reference voltage Vref2 at a first terminal (for example, an inverting terminal) and receives the feedback voltage Vfb at second terminal (for example, a noninverting terminal) and compares the second reference voltage Vref2 against the feedback voltage Vfb to generate a second control signal Va2. The first reference voltage Vref1 and the second reference voltage Vref2 are input signals of the dual-input voltage regulating circuit 100 having values that may be varied according to the required target voltage range of the output voltage Vreg. For example, suppose that the required target voltage range of the output voltage Vreg has a minimum limit V_min and a maximum limit V_max, then the first reference voltage Vref1 and the second reference voltage Vref2 are in the range of $$\left[\frac{V\_min - \Delta V}{K}, \frac{V\_max}{K}\right],$$

where K is a ratio of the output voltage Vreg to the feedback voltage Vfb, and ΔV is a maximum allowed undershoot voltage of the dual-input voltage regulating circuit 100. In an embodiment, the first reference voltage Vref1 and the second reference voltage Vref2 are different. In an embodiment, the first reference voltage Vref1 is lower than the second reference voltage Vref2.

In case a change (e.g., a load current change or a line voltage change) occurs to static conditions of the dual-input voltage regulating circuit 100, the output voltage Vreg changes accordingly to compensate for the change in the load current or the line voltage.

For example, a sudden increase in the load current or a sudden decrease in the second input voltage Vin_L may cause the output voltage Vreg to sag/decrease. When the feedback voltage Vfb that is indicative of the output voltage Vreg becomes lower than the second reference voltage Vref2 but higher than the first reference Vref1, the second sub voltage regulating circuit 120 increases the second LDO current Ilod2 to accommodate the increased load current Ireg. Specifically, the second control signal Va2 provided by the second differential amplifier AMP2 decreases the second pass device MP2's resistance by increasing its gate-to-source voltage, so as to increase the second LDO current Ilod2. No current (i.e., the first LDO current Ildo1) is provided by the first sub voltage regulating circuit regulator 110 in this situation. When the feedback voltage Vfb becomes lower than or equal to the first reference Vref1, the first control signal Va1 generated by the first differential amplifier AMP1 enables providing of the first LDO current Ildo1 from the first input terminal 130 to the output terminal 150 by turning on the first pass device MP1. The first LDO current Ildo1 is provided together with the second LDO current ILDO2 to accommodate the increased load current and to regulate the output voltage Vreg to the first target voltage value V_target1. In an embodiment, the first sub voltage regulating circuit regulator 110 is enabled to provide the first LDO current Ildo1 at a time when the output voltage Vreg has reached a value (hereinafter referred to as an out-regulation value) that causes the second sub voltage regulating circuit 120 to fall out of regulation. Said out-regulation value is determined based on the second input voltage Vin_L, the second reference voltage Vref2, a magnification of the second error amplifier AMP2, and operating parameters (e.g., the minimum drain-to-source resistance ($R_{DS(on)}$ and a corresponding gate-to-source voltage, ext.) of the second pass device MP2. Therefore, in an embodiment, the first reference voltage Vref1 is equal to said out-regulation value. In another embodiment, the first reference voltage Vref1 is equal to said out-regulation value plus a predetermined threshold value.

Figure 2A:
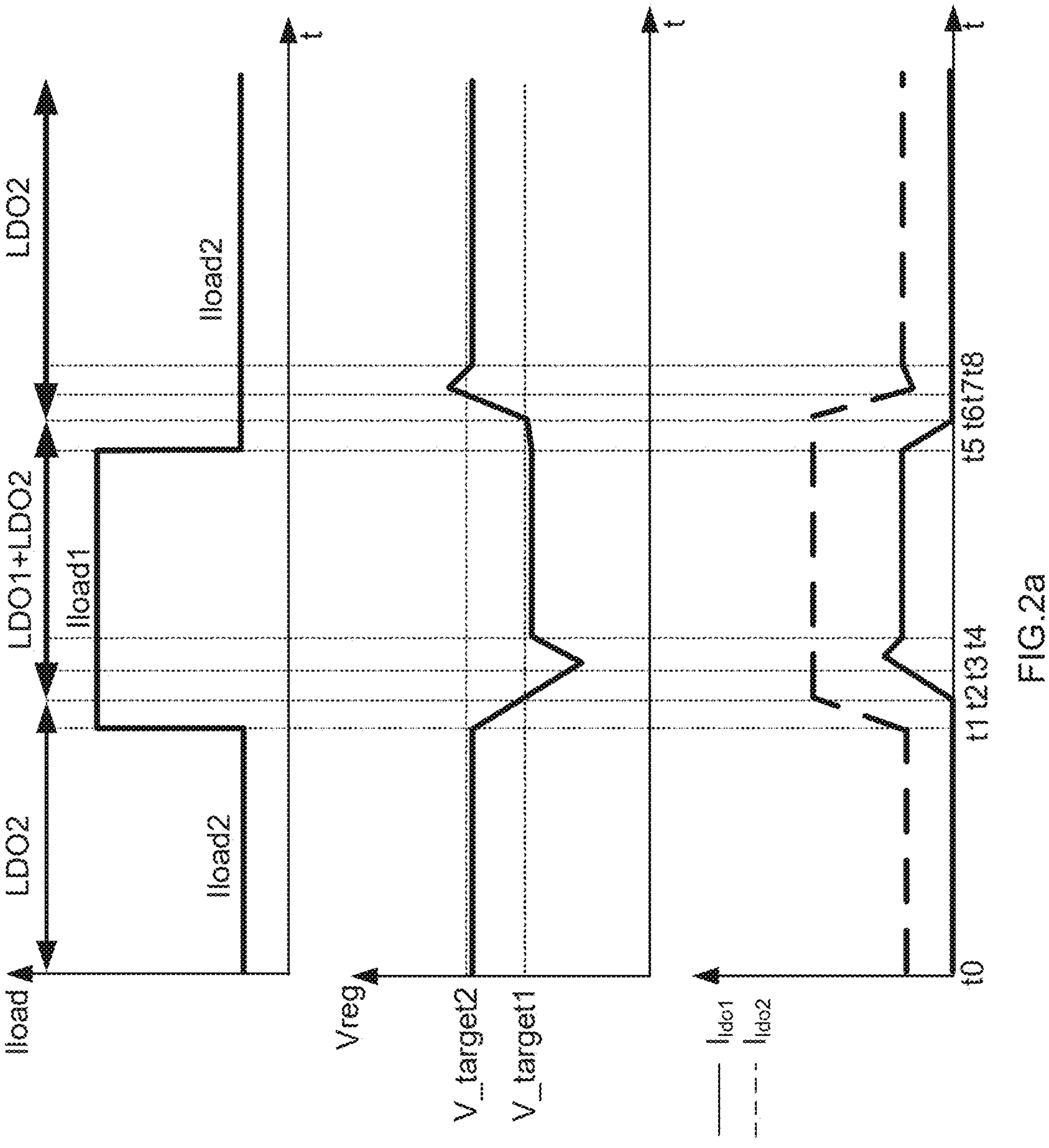
FIG. 2*a* shows a waveform graph illustrating waveforms of the load current Iload, the regulated voltage Vreg, the first LDO current Ildo1 and the second LDO current Ildo2 when a load transient occurs, in accordance with an embodiment of the present invention.

FIG. 2*a* shows a waveform graph illustrating waveforms of the load current Iload, the regulated voltage Vreg, the first LDO current Ildo1 flowing through the first sub voltage regulating circuit 110 (shown as LDO1 in FIG. 2*a*) and the second LDO current Ildo2 flowing through the second sub voltage regulating circuit 120 (shown as LDO2 in FIG. 2*a*) when a load transient occurs, in accordance with an embodiment of the present invention. In an embodiment, the load transient may occur, for example, when the dual-input LDO voltage regulating circuit 100's load (such as the other low-voltage circuit elements in the aforementioned step-down power converter) suddenly transits from high-speed operation state to an inactive state or vice versa.

From time t0 to time t1, the dual-input LDO voltage regulating circuit 100 is in a steady state (hereinafter referred to a second steady state). The first sub voltage regulating circuit 110 (or, LDO1) does not provide any current from the first input terminal 130 to the output terminal 150, and the second sub voltage regulating circuit 120 (or, LDO2) is working to provide the second LDO current Ildo2 from the second input terminal 140 to the output terminal 150 and convert the second input voltage Vin_L to the output voltage Vreg. In such second steady state, the load current Iload is at Iload2 which is equal to a value of the second LDO current Ildo2 provided by the second sub voltage regulating circuit 120 (or, LDO2), and the output voltage Vreg is regulated and maintained at the second target value V_target2 by the second sub voltage regulating circuit 120 (or LDO2).

At the time t1, the load current Iload suddenly steps from Iload2 to Iload1, which cause the output voltage Vreg to sag/decrease from V_target2.

From the time t1 to time t2, as shown in FIG. 2*a*, the resulting change in the output voltage is smaller than a difference between the first target voltage value V_target1 and the second target voltage value V_target2, which causes the feedback voltage Vfb being lower than the second reference voltage Vref2 but higher than the first reference voltage Vref1. Therefore, from the time t1 to the time t2, the first sub voltage regulating circuit 110 (or, LDO1) still does not provide the first LDO current Ildo1, and the second sub voltage regulating circuit 120 (or, LDO2) reacts to increase the second LDO current Ildo2 to accommodate the increased load current Iload. For example, the second control signal Va2 provided by the second differential amplifier AMP2 decreases the second pass device MP2's resistance by increasing the second pass device MP2's gate-to-source voltage, so as to increase the second LDO current Ildo2.

At the time t2, the second pass device MP2's resistance has decreased to its minimum drain-to-source resistance ($R_{DS(on)}$), so the second LDO current Ildo2 flowing through the second sub voltage regulating circuit 120 (or, LDO2) reaches a maximum constant level, i.e., the second sub voltage regulating circuit 120 (or, LDO2) is no longer be able to provide any additional current to accommodate the increased load current Iload or regulate the output voltage vreg anymore. At this time, the feedback voltage Vfb that is indicative of the output voltage Vreg becomes equal to the first reference voltage Vref1, causing the first PMPS pass device MP1 in the first sub voltage regulating circuit 110 (or, LDO1) to be turned on, so as to enable providing current (e.g., the first LDO current Ildo1) from the first input terminal 130 to the output terminal 150. As such, the first sub voltage regulating circuit 110 may assist in providing the first LDO current Ildo1 and regulating the output voltage Vreg without turning off the second sub voltage regulating circuit 120 when the second sub voltage regulating circuit 120 falls out of regulation. As a result, a undershoot may be reduced since there is no hard handover between the main power supply and the auxiliary power supply, i.e., first turning off the main power supply and then turning on the auxiliary power supply.

It should be understood that what shown in FIG. 2*a* is only an example, in other embodiment where the first reference voltage Vref1 is equal to said out-regulation value plus the predetermined threshold value, the first PMPS pass device MP1 may also be turned on before the time t2, that is, before the pass device MP2 reaches to its minimum drain-to-source resistance ($R_{DS(on)}$.

Until time t3, the output current Iload (i.e., Ildo1+Ildo2) provided by LDO1 and LDO2 becomes larger than the load current Iload, which brings the output voltage Vreg up to the second target voltage value V_target2 at time t4. In other words, the dual-input LDO voltage regulating circuit 100 is brought to another steady state (hereinafter referred to as a first steady state) at the time t4. As can be seen from FIG. 2*a*, even when the dual-input LDO voltage regulating circuit 100 returns to the steady state (e.g., the first steady state), the output voltage Vreg is at a constant voltage value that is slightly lower than the second target voltage value V_target2 because the first LDO current Ildo1 has increased since the time t2.

From the time t4 to time t5, the dual-input LDO voltage regulating circuit 100 is maintained at the first steady state through the regulation of both the first sub voltage regulating circuit 110 (or, LDO1) and the second sub voltage regulating circuit 120 (or, LDO2).

At the time t5, the load resistance suddenly decreases, causing the load current Iload starts to decrease from Iload1 to Iload2), and causing the output voltage Vreg to rise/increase.

From the time t5 to time t6, the output voltage Vreg increases from the constant voltage value that is slightly lower than the first target voltage value V_target1 to the first target voltage value V_target1. During this period, LDO1 and LDO2 operate simultaneously to provide the first LDO current Ido1 and the second LDO current Ido2 to the output terminal 150. As the output voltage increases, the second pass device MP2's resistance remains at its minimum the time t5 to time t6, so the second LDO current Ildo2 stays unchanged. The first control signal Va1 drives the first pass device MP1's gate to increase MP1's resistance and decrease the first LDO current Ido1 flowing through LDO1, so as to accommodate the decreased load current Iload.

At the time t6, the feedback voltage Vfb that is indicative of the output voltage Vreg becomes higher than the first reference voltage Vref1. The first PMOS pass device MP1 is turned off to cutoff the first LDO current Ildo1. From this time, the pass device MP2 starts to increase from its minimum drain-to-source resistance ($R_{DS(on)}$), and the second LDO current Ildo2 flowing through the second sub voltage regulating circuit 120 (or, LDO2) starts to decrease. It should be understood that what shown in FIG. 2*a* is only an example. In other embodiment where the first reference voltage Vref1 is equal to said out-regulation value plus the predetermined threshold value, the first PMPS pass device MP1 may also be turned off after the time t6, that is, after the pass device MP2 starts to increase from its minimum drain-to-source resistance ($R_{DS(on)}$).

From the time t6 to time t7, the output voltage Vreg continues to increase. The first PMOS pass device MP1 remains off, and the second sub voltage regulating circuit 120 decreases the second LDO current Ilod2 to accommodate the decreased load current Iload and to regulate the output voltage Vreg back to the second target voltage value V_target2. Specifically, the second control signal Va2 provided by the second differential amplifier AMP2 increases the second pass device MP2's resistance by decreasing the second pass device MP2's gate-to-source voltage to decrease the second LDO current Ildo2.

Until the time t7, the output current (i.e., the second LDO current Ildo2 provided by LDO2) becomes lower than the load current Iload, which brings the output voltage Vreg down to the second target voltage value V_target2 at time t8. In other words, the dual-input LDO voltage regulating circuit 100 is brought to the second steady state at the time t8.

Figure 2B:
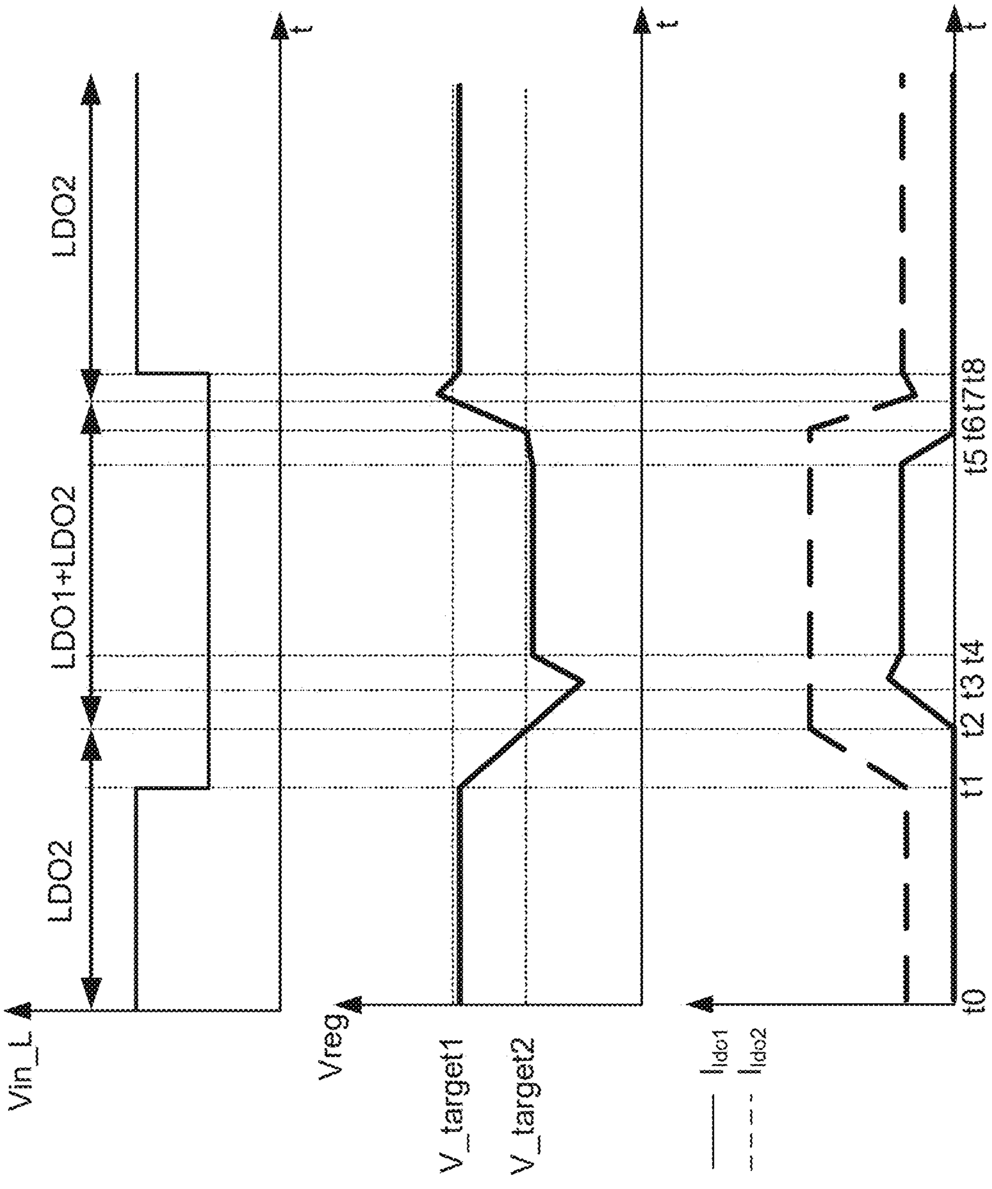
FIG. 2*b* shows a waveform graph illustrating waveforms of the first input voltage Vin_L, the regulated voltage Vreg, the first LDO current Ildo1 and the second LDO current Ildo2 when a line transient occurs, in accordance with an embodiment of the present invention.

FIG. 2*b* shows a waveform graph illustrating waveforms of the second input voltage Vin_L, the regulated voltage Vreg, the first LDO current Ildo1 flowing through the first sub voltage regulating circuit 110 (shown as LDO1 in FIG. 2*b*) and the second LDO current Ildo2 flowing through the second sub voltage regulating circuit 120 (shown as LDO2 in FIG. 2*b*) when a line transient occurs, in accordance with an embodiment of the present invention. In an embodiment, the line transient may occur due to factors like the second input voltage Vin_L's variations or disturbances. As shown in FIG. 2*b*, the line transient response of the dual-input Voltage regulating circuit 100 is similar with that of the load transient response. The only difference is that decreases or increases of the output voltage Vreg in FIG. 2*a* is caused by the decrease or increase of the second input voltage Vin_L. In order to facilitate the description of the present invention, the description for the details of the waveforms in FIG. 2*b* is omitted.

As such, by setting the second reference voltage Vref2 to be higher than the first reference voltage Vref1, the lower input voltage Vin_L may act as the main power supply to provide the regulated voltage, and the higher input voltage Vin_H may assist in providing power only when the second voltage regulating circuit 120 falls or is about to fall out of regulation. In this way, the overall power loss and heat dissipation can be reduced. Moreover, a undershoot may also be reduced since there is no hard handover between the main power supply and the auxiliary power supply.

Figure 3:
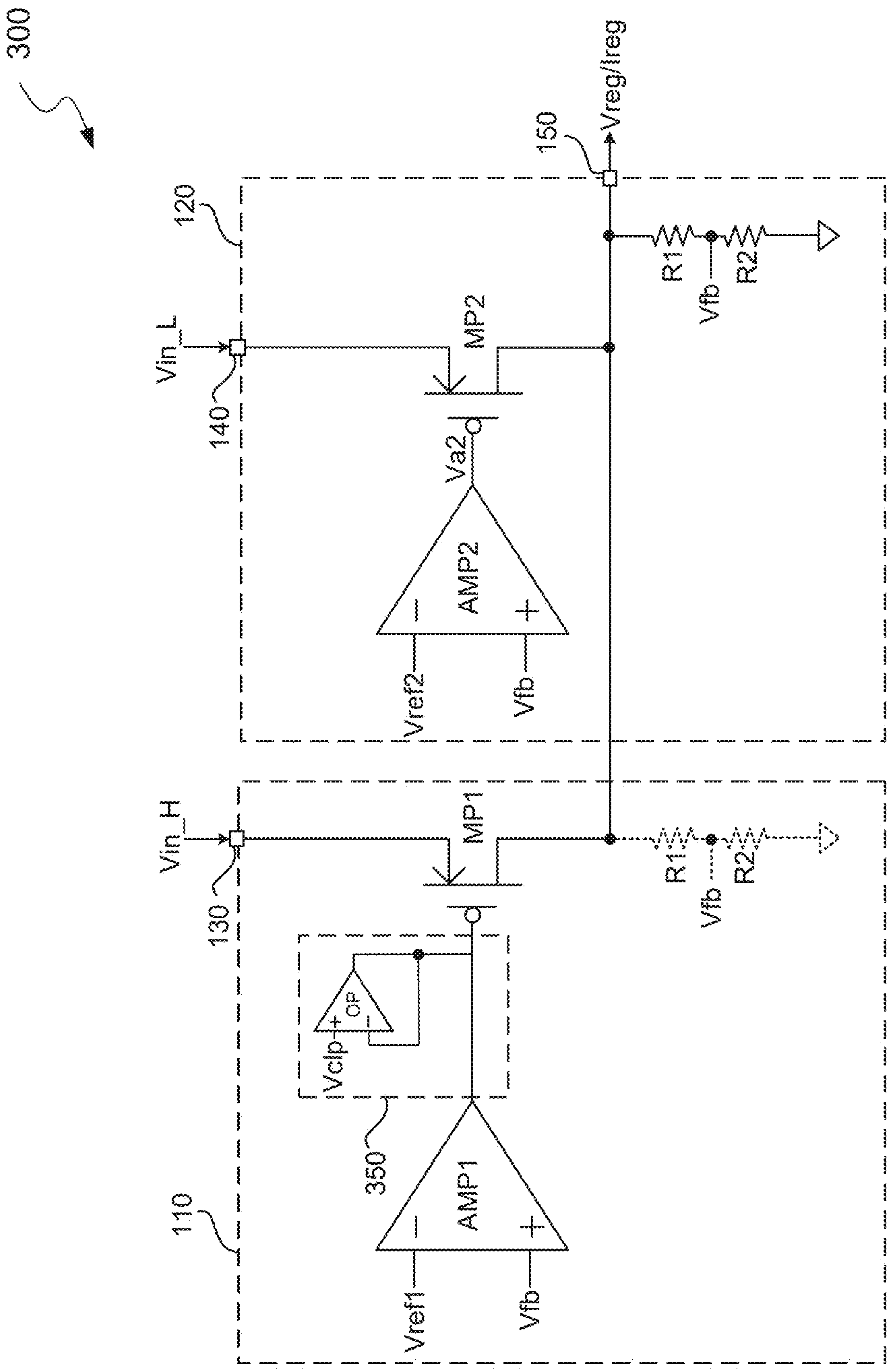
FIG. 3 illustrates a circuit diagram of a dual-input Voltage regulating circuit 300, in accordance with another embodiment of the present invention.

In the embodiment shown in FIG. 1, the first sub voltage regulating circuit 110 can assist in supplying current and regulate the output voltage when the second sub voltage regulating circuit 120 no longer has the ability to provide additional current. However, a delay time exist from a time when the feedback voltage Vfb becomes lower than the first reference voltage Vref1 to a time when the control signal Va1 turning on the first pass device MP1 in the first sub voltage regulating circuit 110 to enabling the providing of the first LDO current Ildo1 from the first input terminal 130 to the output terminal 150, which may inevitably increase the undershoot. The present invention proposes another improved dual-input voltage regulating circuit which may further reduce the undershoot on the output. FIG. 3 illustrates a circuit diagram of a dual-input Voltage regulating circuit 300, in accordance with another embodiment of the present invention.

As can be seen from FIG. 3, as compared with the dual-input voltage regulating circuit 100 as shown and described in FIG. 1 and FIGS. 2*a* to 2*b*, the dual-input voltage regulating circuit 300 shown in FIG. 3 further includes a clamping circuit 350 which is configured to reduce the time delay from the time when the feedback voltage Vfb becomes lower than the first reference voltage Vref1 to the time when the control signal Va1 turning on the first pass device MP1. Specifically, the clamping circuit 350 may clamp a voltage on a control terminal of the first pass device MP1 to a reference voltage Vclp, such that a gate-to-source voltage of the first pass device MP1 is kept at its minimum threshold voltage VGS(th). The clamping circuit 350 shown in FIG. 3 is only for illustration. The present invention may include any type of clamping circuit that may clamp the voltage on the control terminal of the first pass device MP1 to a certain value (for example, the reference voltage Vclp) such that the gate-to-source voltage of the first pass device MP1 is kept at its minimum threshold voltage VGS(th).

Figure 4:
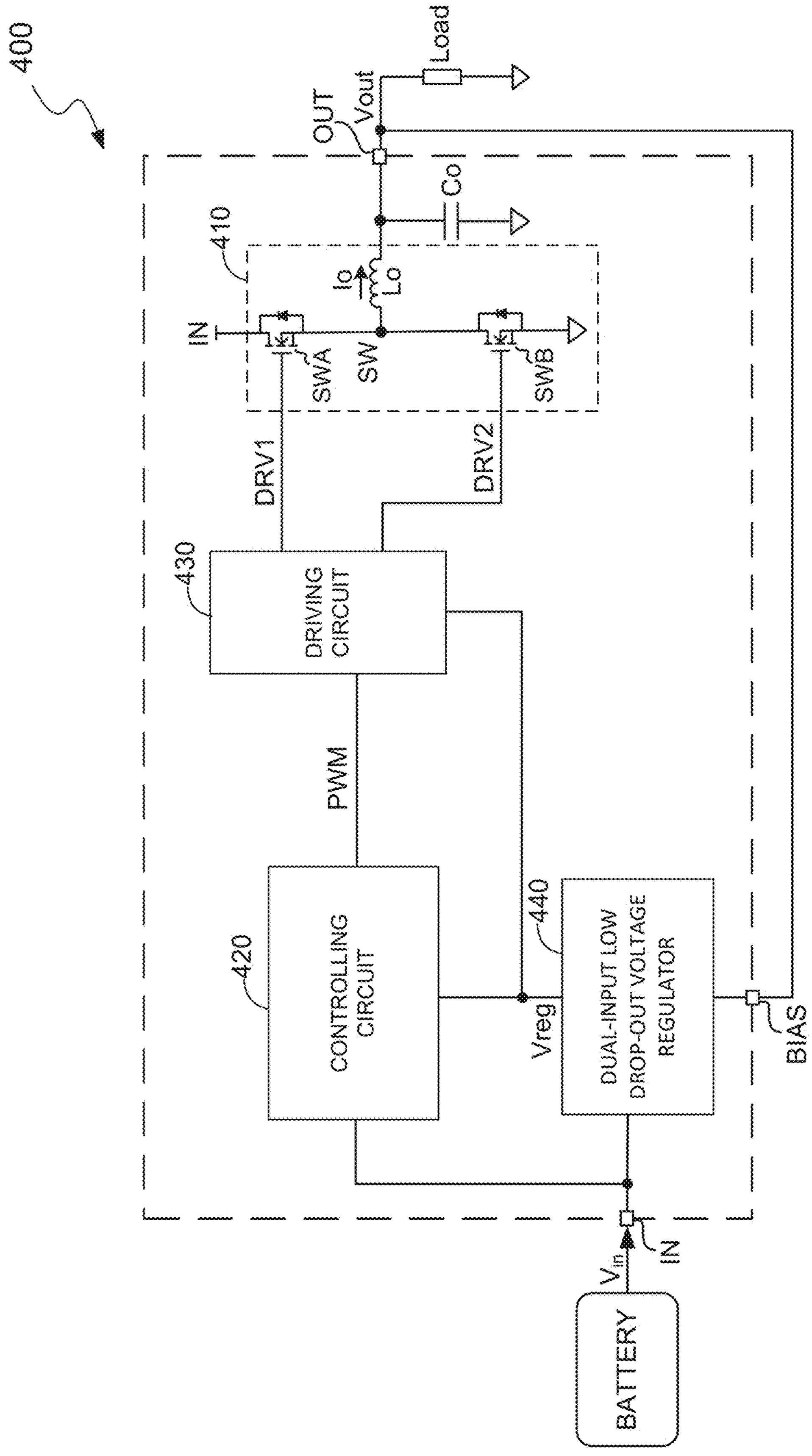
FIG. 4 is a block diagram of a switching power converter 400, in accordance with an embodiment of the present invention.

FIG. 4 is a block diagram of a switching power converter 400, in accordance with an embodiment of the present invention.

According to one exemplary embodiment of the present invention, the switching power converter 400 is configured to operate in a wide and high input voltage range, for example, from 30V to 60V. In an example shown in FIG. 4, the switching power converter 400 receives input voltage Vin from a battery. In an embodiment, the switching power converter 400 is configured to provide a wide and low output voltage range, for example, from 1V to 12V. In the example shown in FIG. 4, the switching power converter 400 provides an output voltage Vout to a load. In such embodiment, the switching power converter 400 includes a buck (or a step-down) regulator for converting the high input voltage to a low output voltage. For a typical buck (or a step-down) regulator, as shown in FIG. 4, the switching power converter 400 includes a power stage switching unit 410, a controlling circuit 420, a driving circuit 430, and a dual-input voltage regulating circuit 440. The dual-input voltage regulating circuit 440 is an embodiment of the aforementioned dual-input voltage regulating circuits 100 or 300. FIG. 4 is described with reference to FIG. 1, FIGS. 2*a* to 2*b* and FIG. 3.

According to one exemplary embodiment of the present invention, the switching power converter 400 is configured to charge or discharge an inductive energy storage component (e.g., an input inductor Lo as illustrated in FIG. 4) based on a high side driving signal DRV1 and a low side driving signal DRV2, so that the input voltage Vin is converted to the output voltage Vout. In the example of FIG. 4, the power stage switching unit 410 includes a first power switch SWA and a second power switch SWB that are coupled between the input terminal IN and a power reference ground. The first power switch SWA and the second power switch SWB share a common connection terminal SW. The common connection terminal SW is coupled to the power output terminal OUT through, for example, the inductive energy storage component Lo. Accordingly, in the example of FIG. 4, the power stage switching unit 410 is configured to be a step-down power converter topology.

According to one exemplary embodiment of the present invention, the controlling circuit 420 is configured to provide a switching control signal (for example, a Pulse Width Modulation ("PWM") signal) to the driving circuit 430. The driving circuit 430 is configured to provide driving signals (e.g., the high side driving signal DRV1 and the low side driving signal DRV2 as illustrated in FIG. 4) based on the switching control signal PWM received from the controlling circuit 420. For example, in the case of step-down conversion, the high side driving signal DRV1 is the same in polarity to or synchronous with the PWM signal, and the low side driving signal DRV2 is opposite in polarity to the PWM signal. The high side driving signal DRV1 and low side driving signal DRV2 are used to alternately turn on or off the power switches SWA and SWB in the power stage switching unit 410, so that the switching power converter 400 can convert the input voltage Vin into the output voltage Vout which is then provided to the load. In an implementation, the controlling circuit 420 and the driving circuit 430 are integrated on a same die and packed in a chip for controlling the turning on or off of the power switches SWA and SWB. In another implementation, the driving circuit 430 and the power switches SWA and SWB are integrated on a same die and packed in a chip which may be called a DrMOS, and the controlling circuit 420 is integrated in another die for providing the switching control signal to the DrMOS.

According to one exemplary embodiment of the present invention, the dual-input voltage regulating circuit 440 may be configured to provide a regulated voltage (e.g., indicated as Vreg in FIG. 4) to support other low-voltage modules (e.g., low-voltage modules in the controlling circuit 420 and the driving circuit 430) in the switching power converter 400. In an embodiment, the dual-input voltage regulating circuit 440 draws power from the input voltage Vin through a power input terminal IN and the output voltage Vout through a bias terminal BIAS and provide the regulated voltage Vreg to the other low-voltage modules.

For some actual application scenarios, the input voltage Vin of the switching power converter 400 is substantially higher than the output voltage Vout, and the output voltage Vout is higher but close to the regulated voltage Vreg. As a result, a dropout voltage between the input voltage Vin and the output voltage Vreg is much higher than a dropout voltage between the output voltage Vout and the output voltage Vreg. For example, a specific operating condition is as follows: Vin=48V, Vout=3.3V, an operating/load current of the dual-input voltage regulating circuit 440 is around 0.03 A, and an operating voltage required for the other low power modules to operate normally is in a range of 2.8V to 3V (that is, the regulated voltage Vreg need to be in a target voltage range of 2.8V to 3V). It should be understood by persons skilled in the art that the value range of the regulated voltage Vreg described herein are merely example and the present invention is not limited thereto. The regulated voltage Vreg may be set according to actual applications and design needs, as long as it may provide power that support the low-voltage modules in the switching power converter 400 to operate normally.

When the dual-input voltage regulating circuit 440 draws power from the power input terminal IN (for example, powered by the input voltage Vin) and needs to adjust the 48V input voltage Vin to the 3V regulated voltage Vreg, the power consumption of the dual-input voltage regulating circuit 440 is around (48V-3V)*0.03 A=1.35 W. When the dual-input voltage regulating circuit 440 draws power from the bias terminal BIAS (for example, powered by the output voltage Vout) and needs to adjust the 3.3V output voltage Vout to the 3V regulated voltage Vreg, the power consumption of the dual-input voltage regulating circuit 440 is around (3.3V-3V)*0.03 A=0.009 W.

Accordingly, compared with the 1.35 W power consumption generated by supplying power from the input terminal IN, the 0.009 W power consumption generated by supplying power from the bias terminal BIAS is significantly reduced, and the heat generated correspondingly is greatly reduced as well. Therefore, in order to achieve the most optimized voltage conversion efficiency and reduce power consumption and heat dissipation, the output voltage Vout may be used as a main power supply during normal operation of the switching power converter 400 and the input voltage Vin may be used as an auxiliary power supply which assists in supplying power when the main power supply fails or is about to fail to sustain the regulated voltage Vreg to the target voltage range or no longer be able to provide additional current.

Figure 5:
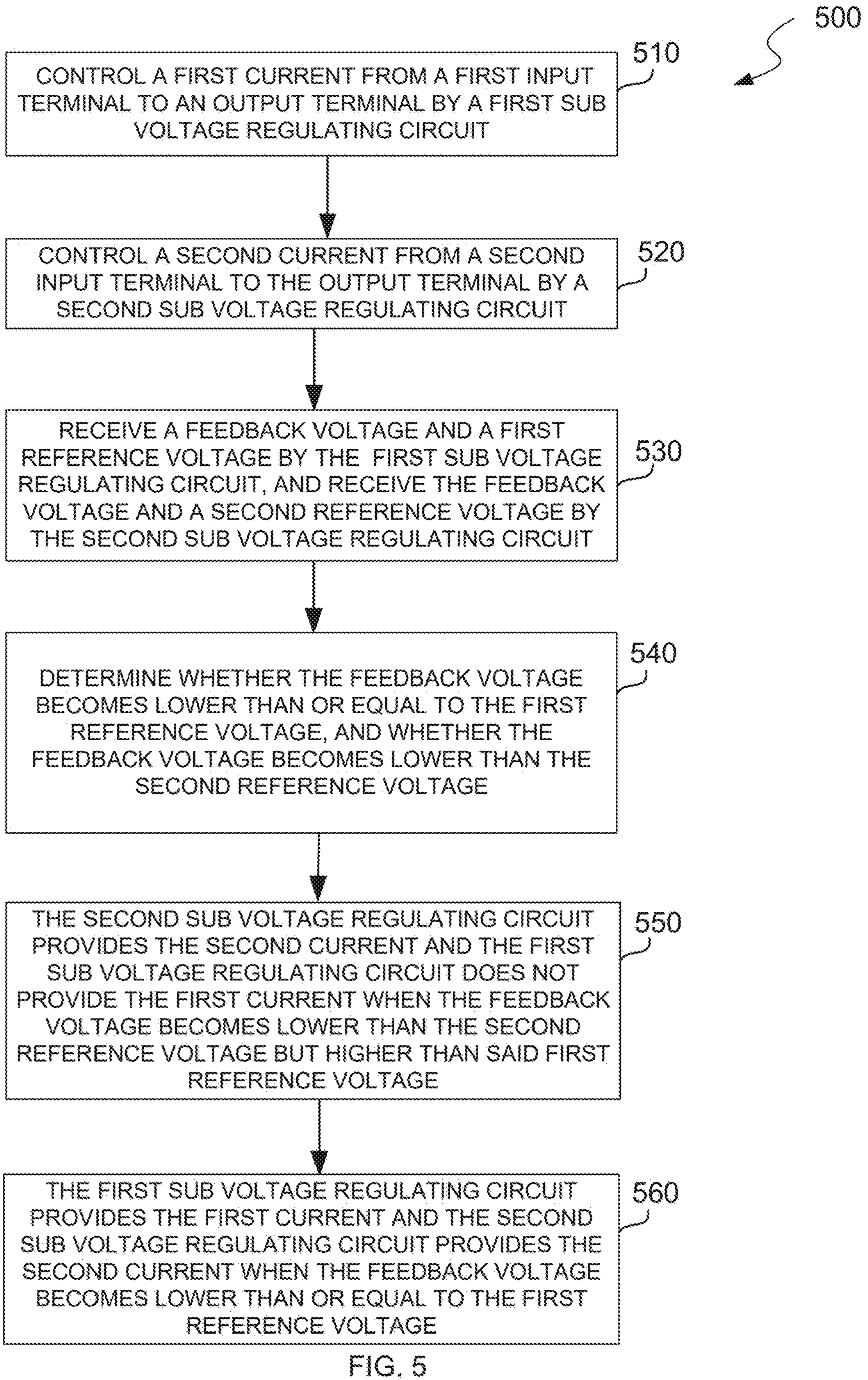
FIG. 5 is a flowchart of a procedure 500 for regulating an output voltage based on two different input voltages, in accordance with an embodiment of the present invention.

FIG. 5 is a flowchart of a procedure 500 for regulating an output voltage based on two different input voltages, in accordance with an embodiment of the present invention. The procedure 500 is performed by a dual-input voltage regulating circuit (e.g., 100 or 300) including a first sub voltage regulating circuit (e.g., 110) and a second sub voltage regulating circuit (e.g., 120) connected in parallel. FIG. 5 is described in combination with FIG. 1 to FIG. 3. The procedure 500 may include the following actions 510-540.

In action 510, the first sub voltage regulating circuit (e.g., 110) controls a first current from a first input terminal to an output terminal.

In action 520, the second sub voltage regulating circuit (e.g., 120) controls a second current from a second input terminal to the output terminal.

In action 530, a first differential amplifier (e.g., AMP1) in the first sub voltage regulating circuit receives a feedback voltage that is indicative of the output voltage and a first reference voltage; and second differential amplifier (e.g., AMP2) in the second sub voltage regulating circuit receives the feedback voltage and a second reference voltage.

In action 540, it is determined whether the feedback voltage becomes lower than the second reference voltage by comparing the feedback voltage to the first reference voltage and whether the feedback voltage becomes lower than or equal to the first reference voltage by comparing the feedback voltage to the second reference voltage.

In action 550, when the feedback voltage becomes lower than the second reference voltage but higher than the first reference voltage, the second sub voltage regulating circuit provides the second current from the second input terminal to the output terminal, and the first sub voltage regulating circuit does not provide the first current from the first input terminal to the output terminal.

In action 560, when the feedback voltage becomes lower than or equal to the first reference voltage, the first sub voltage regulating circuit provides the first current and the second sub voltage regulating circuit provides the second current to the output terminal.

Although the present invention has been described with reference to several exemplary embodiments, it should be understood that the terminology used herein is illustrative and exemplary rather than limiting. As the present invention can be embodied in various forms without departing from the spirit or essence of the present invention, it should be understood that the above-mentioned embodiments are not limited to any of the foregoing details, but should be broadly interpreted within the spirit and scope defined by the appended claims, and therefore all changes and modifications that fall within the scope of the claims or their equivalents are intended to be covered by the appended claims.

What is claimed is:

1. A dual-input voltage regulating circuit, comprising:

a first input terminal, configured to receive a first input voltage;

a second input terminal, configured to receive a second input voltage, wherein the first input voltage is higher than the second input voltage; and an output terminal, configured to provide a regulated output voltage;

wherein the dual-input voltage regulating circuit is configured to draw power from at least one of the first input voltage and the second input voltage; and wherein when the regulated output voltage is maintained at a first voltage value, the dual-input voltage regulating circuit draws power from both the first input voltage and the second input voltage; and wherein when the regulated output voltage is maintained at a second voltage value, the dual-input voltage regulating circuit draws power from the second input voltage and does not draw power from the first input voltage, and wherein the first voltage value is lower than the second voltage value.

2. The dual-input voltage regulating circuit of claim 1, further comprising:

a first sub voltage regulating circuit, coupled between the first input terminal and the output terminal, and configured to control a first current from the first input terminal to the output terminal; and a second sub voltage regulating circuit, coupled between the second input terminal and the output terminal, and configured to control a second current from the second input terminal to the output terminal.

3. The dual-input voltage regulating circuit of claim 2, wherein each of the first sub voltage regulating circuit and the second sub voltage regulating circuit comprises a low drop-out (LDO) voltage regulator.

4. The dual-input voltage regulating circuit of claim 2, wherein the first sub voltage regulating circuit comprises a first differential amplifier, a first pass device, and a feedback circuit; and the second sub voltage regulating circuit comprises a second amplifier, a second pass device, and said feedback circuit, wherein the first differential amplifier is configured to compare a feedback voltage that is indicative of the regulated output voltage with a first reference voltage, and generate a first control signal to control the first pass device; and the second differential amplifier is configured to compare the feedback voltage that is indicative of the regulated output voltage with a second reference voltage, and generate a second control signal to control the second pass device, wherein the first reference voltage is lower than the second reference voltage.

5. The dual-input voltage regulating circuit of claim 4, wherein when the feedback voltage becomes lower than the second reference voltage and higher than the first reference voltage, the second sub voltage regulating circuit draws power from the second input voltage and provides the second current from the second input terminal to the output terminal, and the first sub voltage regulating circuit doesn't provide the first current from the first input terminal to the output terminal, and when the feedback voltage becomes lower than the first reference voltage, the second sub voltage regulating circuit draws power from the second input voltage and provides the second current from the second input terminal to the output terminal, and the first sub voltage regulating circuit draws power from the first input voltage and provides the first current from the first input terminal to the output terminal.

6. A switching power converter, configured to convert an input voltage to an output voltage which is lower than the input voltage, wherein the switching power converter comprises:

a power input terminal configured to receive the input voltage;

a bias terminal configured to receive the output voltage; and a dual-input voltage regulating circuit, comprising:

a first input terminal, configured to receive the input voltage through the power input terminal;

a second input terminal, configured to receive the output voltage through the bias terminal; and an output terminal, configured to provide a regulated output voltage;

wherein the dual-input voltage regulating circuit is configured to draw power from at least one of the input voltage and the output voltage; and wherein when the regulated output voltage is maintained at a first voltage value, the dual-input voltage regulating circuit draws power from both the input voltage and the output voltage; and when the regulated output voltage is maintained at a second voltage value, the dual-input voltage regulating circuit draws power from the input voltage and does not draw power from the output voltage.

7. The switching power converter of claim 6, wherein the dual-input voltage regulating circuit further comprises:

a first sub voltage regulating circuit, coupled between the first input terminal and the output terminal, and configured to control a first current from the first input terminal to the output terminal; and a second sub voltage regulating circuit, coupled between the second input terminal and the output terminal, and configured to control a second current from the second input terminal to the output terminal.

8. The switching power converter of claim 7, wherein each of the first sub voltage regulating circuit and the second sub voltage regulating circuit comprises a low drop-out (LDO) voltage regulator.

9. The switching power converter of claim 7, wherein the first sub voltage regulating circuit comprises a first differential amplifier, a first pass device, and a feedback circuit; and the second sub voltage regulating circuit comprises a second amplifier, a second pass device, and said feedback circuit, and wherein the first differential amplifier is configured to compare a feedback voltage that is indicative of the regulated output voltage with a first reference voltage and generate a first control signal to control the first pass device; and the second differential amplifier is configured to compare the feedback voltage that is indicative of the regulated output voltage with a second reference voltage and generate a second control signal to control the second pass device, wherein the first reference voltage is lower than the second reference voltage.

10. The switching power converter of claim 9, wherein when the feedback voltage becomes lower than or equal to the second reference voltage and higher than the first reference voltage, the second sub voltage regulating circuit draws power from the output voltage and provides the second current from the second input terminal to the output terminal, and the first sub voltage regulating circuit doesn't provide the first current from the first input terminal to the output terminal, and when the feedback voltage becomes lower than the first reference voltage, the second sub voltage regulating circuit draws power from the output voltage and provides the second current to the output terminal, and the first sub voltage regulating circuit draws power from the input voltage and provides the first current to the output terminal.

11. A voltage regulating method, comprising:

controlling, by a first sub voltage regulating circuit, a first current provided from a first input terminal to an output terminal, controlling, by a second sub voltage regulating circuit, a second current provided from a second input terminal to the output terminal;

receiving, by the first sub voltage regulating circuit, a feedback voltage that is indicative of an output voltage on the output terminal and a first reference voltage;

receiving, by the second sub voltage regulating circuit, the feedback voltage and a second reference voltage, wherein the first reference voltage is lower than the second reference voltage;

determining, by the first sub voltage regulating circuit, whether the feedback voltage becomes lower than or equal to the first reference voltage by comparing the feedback voltage to the first reference voltage; and determining, by the second sub voltage regulating circuit, whether the feedback voltage becomes lower than the second reference voltage by comparing the feedback voltage to the second reference voltage;

wherein when the feedback voltage becomes lower than the second reference voltage but higher than the first reference voltage, the second sub voltage regulating circuit provides the second current from the second input terminal to the output terminal and the first sub voltage regulating circuit does not provide the first current from the first input terminal to the output terminal, and when the feedback voltage becomes lower than or equal to the first reference voltage, the first sub voltage regulating circuit provides the first current from the first input terminal to the output terminal and the second sub voltage regulating circuit provides the second current from the second input terminal to the output terminal.

* * * * *